H. ZIMMERMANN.
HEAT EXCHANGING APPARATUS.
APPLICATION FILED NOV. 12, 1914.
1,277,526.
Patented Sept. 3, 1918.
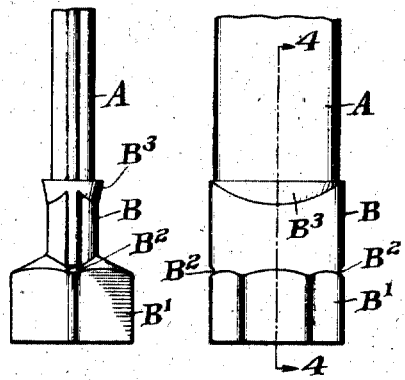
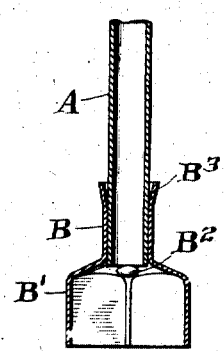
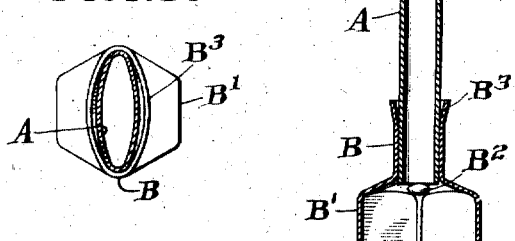
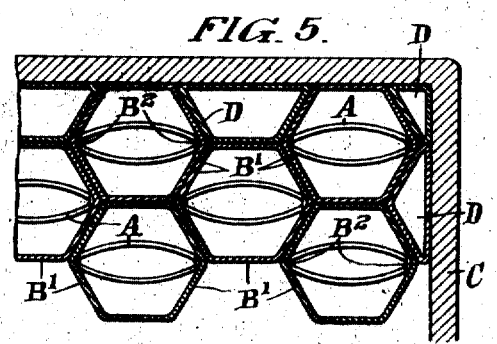
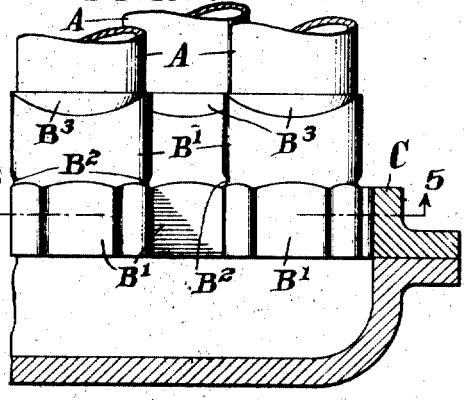
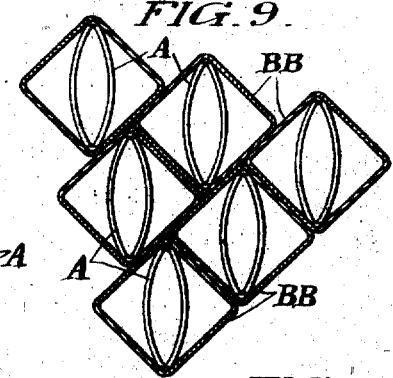
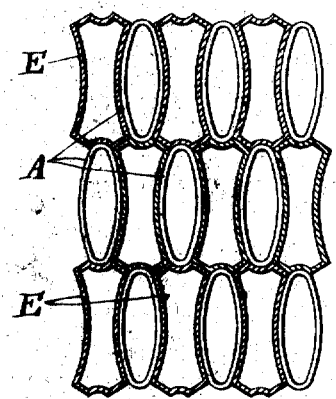
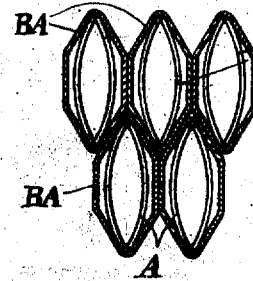

UNITED STATES PATENT OFFICE.

HANS ZIMMERMANN, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA.

HEAT-EXCHANGING APPARATUS.

1,277,526.  Specification of Letters Patent.  Patented Sept. 3, 1918.

Application filed November 12, 1914. Serial No. 871,668.

*To all whom it may concern:*

Be it known that I, HANS ZIMMERMANN, a subject of the German Empire, residing in the city and county of Philadelphia, in the State of Pennsylvania, have invented certain new and useful Improvements in Heat-Exchanging Apparatus, of which the following is a true and exact description, reference being had to the accompanying drawings, which form a part thereof.

The present invention consists of improvements in the structure and mode of construction of tubular heat exchanging apparatus of what may be called the surface condenser type.

The primary object of my invention is to make it possible to effectively unite the ends of a group of tubes employed in a tubular apparatus unit so as to mechanically secure the tubes together and to close the ends of the inter-tube space without the use of the usual apertured tube sheet, by the simple expedient of dipping the ends of the assembled tubes into a molten bath of a suitable soldering or brazing metal, and without requiring any enlargement or other change in the form of the tube ends or any particular cross section or spacing of the tubes.

In carrying out my invention, I provide end pieces which unite with one another and with the tube ends to form a wall closing the end of the inter-tube space except for film like joints extending parallel to the longitudinal direction of the tubes between the different end pieces and between the end pieces and tubes, which, when the assembled tubes and end pieces are dipped in the molten solder metal, are filled by the latter and remain filled, due to capillary action, when the assembled tubes and end pieces are lifted out of the molten material and the latter flows freely out of the open ends of the tubes and out of the larger cavities or spaces in the end pieces when the latter are tubular as is usually desirable.

In a preferred mode of carrying out my invention I employ open ended tubular end pieces each formed at one end to conform in shape to one of the tubes which is inserted therein, and expanded at the other end into a polygonal cross section of such shape and dimensions that it will be separated from the sides of the similar expanded portions of adjacent end pieces only by film like solder receiving joint spaces when the tubes and end pieces are assembled.

The various features of novelty which characterize my invention are pointed out with particularity in the claims annexed to and forming a part of this specification. For a better understanding of the invention, however, and the advantages possessed by it, reference should be made to the accompanying drawings and descriptive matter in which I have illustrated different embodiments of my invention.

Of the drawings:

Figure 1 is an edge elevation, and

Fig. 2, a side elevation of a portion of a tube and end piece therefor, embodying one form of my invention.

Fig. 3 is a plan view of the portion of tube and end piece shown in Figs. 1 and 2.

Fig. 4 is a section taken on the line 4—4 of Fig. 2.

Fig. 5 is a partial sectional plan taken on the line 5—5 of Fig. 6.

Fig. 6 is a partial sectional elevation of heat interchanging apparatus in which my invention is utilized.

Fig. 7 is a sectional elevation of one of the spacers employed in Figs. 5 and 6.

Fig. 8 is a plan view taken generally similarly to Fig. 5 illustrating a modified form of end piece.

Fig. 9 is a view similar to Fig. 5 showing another form of end piece.

Fig. 10 is a view taken similarly to Fig. 5 showing still another modification.

Fig. 11 is a sectional elevation of one of the end pieces shown in Fig. 10.

In the drawings and referring first to the construction shown in Figs. 1 to 7, A represents the oval tubes of a tubular heat interchanging apparatus suitable for use as a water cooler or radiator for automobile and airship engines. On the ends of the tubes are slipped sleeve like end pieces B. The end pieces B are each shaped throughout a portion of its length to snugly receive the corresponding end of a corresponding tube A, and at its other end B', is expanded and made polygonal in cross section. Advantageously each end piece B is formed with indentations, B², or the like at the inner end of the unexpanded portion, limiting the extent to which the corresponding tube A may extend into the end piece. The enlarged portions B' of the end pieces B fit snugly together when the tubes are assembled.

The only joints in the end wall closing the inter-tube space, when the tubes and end pieces are bundled together, are film like joints between the tube ends and the surrounding portions of the end pieces telescoping therewith, and film like joints between the expanded polygonal portions B' of the end pieces. To seal these film like joints and rigidly connect the tubes and end pieces, the assembled tubes and end pieces are dipped in a molten bath of a suitable solder metal or alloy and are held in the bath for a short period of time until these joints fill with molten solder material. When thereafter the tubes and end pieces are lifted out of the bath, the solder material runs freely out of the open ends of the tubes and end pieces but is retained in the film like joints by capillary attraction during the period required for the solder material to cool and solidify.

Advantageously, the reduced or smaller ends of the sleeve members B are slightly expanded at their opposite flattened sides as indicated at B². The enlarged joint end thus provided insures a substantial solder seam between the inner end of each end piece and the tube entering it, and also facilitates the rapid assemblage of the tubes and end pieces.

In assembling the tubes and end pieces preparatory to dipping them in the solder bath they must be bundled or held together snugly enough so that the end pieces and tubes will be frictionally held against relative displacement. Ordinarily the tubes and end pieces are assembled in and secured by the solder metal to a hollow frame member such as is formed by the flanged rim C shown in Figs. 5 and 6. As shown in Figs. 5 and 6, spacers D which are preferably tubular with integrally closed inner ends, that is, cup shaped, are employed to fill the spaces left between the rim C and the polygonal shaped portions B' of the end pieces B.

As shown in Figs. 1 to 6 the enlarged ends of the sleeves B are regular hexagons in cross section, but other polygonal forms may be used as required to secure the desired spacing of the tubes, for instance, as shown in Fig. 8, the enlarged portions of the end pieces BA are in the form of flattened hexagons. In Fig. 9 the enlarged sections of the end pieces BB are quadrilateral in cross sectional outline.

Instead of forming the end pieces as open ended tubular parts telescoping with the tubes spaced apart and united thereby, the end pieces may be in the form of tubular parts integrally closed at their inner ends and inserted between the ends of the tubes. The end pieces E shown in Figs. 10 and 11, are of the construction just described. The end pieces E, as well as the spacers D, may be readily and inexpensively stamped out of sheet metal. I prefer, ordinarily, however, to employ the open ended tubular end pieces as shown in Figs. 1 to 6, 8 and 9, rather than end pieces of the character shown in Figs. 10 and 11, because of the ease and accuracy with which the end pieces and tubes may be assembled and frictionally held preparatory to and during the soldering operation when the open ended tubular end pieces are employed.

With either type of end piece it will be obvious however, that the cost of material required to form the end wall closing the inter-tube space of a group of tubes and uniting these tubes, and the cost of assembling and uniting these members is relatively small and wastage is reduced to a minimum. The construction described permits of a great flexibility in assemblage, especially desirable when manufactured on a large scale, for the tubes themselves may be formed by the simple expedient of cutting stock tubes up into the desired lengths, while the same end pieces may be used to form pieces of apparatus in which the tubes are of different lengths and vary in numbers. With my improved construction it is obviously possible to have the tubes spaced as closely together or as far apart as may be desired, and the tubes may be oval or round or of any other desired cross section. The invention is especially useful in apparatus where light weight, small bulk and high efficiency are especially desirable as, for instance, in radiators, for use in cooling the cylinder cooling fluid of gas engines employed to drive motor cars, airships and the like. In such case the liquid to be cooled may pass through the tubes and the air flow cooling the liquid may pass through the inter-tube space.

While in accordance with the statutes I have illustrated and described the best form of my invention now known to me, those skilled in the art will understand that the invention claimed herein is not limited in its broader aspects to the particular features of construction illustrated and described in detail herein.

Having now described my invention, what I claim as new and desire to secure by Letters Patent, is:

1. Tubular apparatus comprising in combination a group of tubes curvilinear in cross section and open ended tubular end pieces, each, for a portion of its length, conforming in shape to, and telescoping with a corresponding tube, and having another portion of its length expanded and of polygonal cross section and fitting against the corresponding portion of adjacent end pieces, and solder sealing the joints between, and rigidly connecting the expanded portions of adjacent end pieces and the telescoping portions of the tubes and end pieces.

2. Tubular apparatus comprising in combination a group of tubes and open ended tubular end pieces, each, for a portion of its length, conforming in shape to, and telescoping with a corresponding tube, and having another portion of its length expanded and of polygonal cross section and fitting against the corresponding portion of adjacent end pieces, and solder sealing the joints between, and rigidly connecting the expanded portions of adjacent end pieces, and the telescoping portions of the tubes and end pieces.

3. Tubular apparatus comprising in combination a group of tubes and open ended tubular end pieces, each telescoping for a portion of its length with a corresponding tube, and having another portion of its length, expanded and of polygonal cross section, and fitting against the corresponding portion of adjacent end pieces, and solder sealing the joints between and rigidly connecting the expanded portions of adjacent end pieces and the telescoping portions of the tubes and end pieces, said pieces each having an integral portion or portions disposed to limit the distance which the inserted tube may extend into the end piece.

4. Tubular apparatus comprising in combination a group of tubes and open ended tubular end pieces, each, for a portion of its length, conforming in shape to, and telescoping with a corresponding tube, and having another portion of its length expanded and of polygonal cross section and fitting against the corresponding portion of adjacent end pieces, and solder sealing the joints between, and rigidly connecting the expanded portions of the tubes and end pieces, said end pieces being each outwardly flared along a portion of its edge at the end into which the corresponding tube is inserted.

5. Tubular apparatus comprising in combination a group of tubes and hollow sheet metal end pieces formed with longitudinal surface portions fitting against external walls of the tubes and with other longitudinal surface portions fitting each against a corresponding surface of another end piece and having transverse portions uniting with said longitudinal portions to close the inter-tube space except for film-like joints along which the said longitudinal surface portions abut against the external walls of the tubes and one another, and solder filling said joints and mechanically uniting said tube.

HANS ZIMMERMANN.

Witnesses:
D. W. HILDRETH,
SIMON. W. SNYDER.